3,398,097
CLEANING COMPOSITION, AND METHOD OF CLEANING AND SEQUESTERING METAL IONS
Paul W. Kersnar and Samuel Taormina, San Francisco, Calif., assignors to Progressive Products Co., San Francisco, Calif., a corporation of California
No Drawing. Filed July 30, 1965, Ser. No. 476,193
9 Claims. (Cl. 252—152)

ABSTRACT OF THE DISCLOSURE

The reaction product of between one mol of ethylene diamine and 2.0 to 3.5 mols of propylene oxide, consisting essentially of a mixture of mono, bis, tris and tetra (beta hydroxy propyl) ethylene diamine in which all substituted groups attached to nitrogen of the product consist essentially of beta hydroxy propyl groups and the free hydrogen atom is attached to at least some of the nitrogen in said reaction product, provides a cleaning, and advantageously a blood stain removing composition in combination with an organic acid, particularly dodecyl benzene sulfonic acid, in aqueous solution, and has metal ion sequestering properties.

This invention relates to detergent type cleaning compositions, a particular type of intermediate for the preparation thereof and which has inherent detergent and metal ion sequestering properties, and to a particular method for making such intermediate.

Hydroxy alkyl amines are widely used as detergents in laundering, dry cleaning, and other cleaners, such as wall, woodwork and floor cleaners. Pursuant to this invention, it has been found that a particular hydroxy alkyl amine provides an advantageous intermediate for the preparation of such cleaning compositions of various kinds and which may have an adjusted pH for various purposes. The particular intermediate reaction product hereof is useful per se as a detergent and also for the sequestering of alkaline earth metal ions, such as calcium and magnesium, in water softening, and also heavy metal ions, such as iron, silver, copper, and as a base or nucleus in the formation of various salts.

Summarizing this invention, such intermediate is the reaction product of ethylene diamine and propylene oxide in proportions of about 1 mol of ethylene diamine to about 2.0 to 3.5 mols of the propylene oxide. When these two compounds, which are liquid, are mixed together in an aqueous vehicle, the reaction proceeds exothermically and is extremely violent unless carefully controlled. One of the bonds in the epoxy group of a propylene oxide molecule splits and combines with a hydrogen atom attached to a nitrogen atom of an ethylene diamine molecule, and forms a hydroxy group; and the nitrogen from which such hydrogen atom has migrated becomes attached to the carbon atom of the epoxy group from which the bond has split. This reaction in equal molar ratios may be expressed theoretically as follows:

Propylene oxide + Ethylene diamine

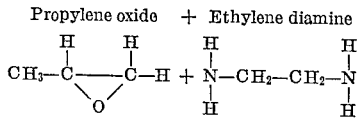

↓

Mono (beta hydroxy propyl) ethylene diamine

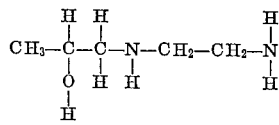

Beta hydroxy propyl group forming the reaction product mono (beta hydroxy propyl) ethylene diamine.

As the molar ratio of propylene oxide to the ethylene diamine increases, mixtures of mono, bis, tris and tetra (beta hydroxy propyl) ethylene diamine are formed. With relatively high concentrations of ethylene diamine in water, such as 80 percent or more, the reaction proceeds with violence, almost with explosive force; and decomposition products are formed such as ammonia, substituted glycols, and possibly amine alcohols; and such decomposition products increase in amount as the molar ratio of propylene oxide to ethylene diamine increases.

It has been found, pursuant to this invention, that for maximum detergent and ion sequestering effect, substantially all the hydroxy groups which are formed should be beta hydroxy propyl groups as indicated above, and the more of such beta hydroxy propyl groups formed in the reaction product, the better as long as forcing conditions are not applied.

To obtain this objective, the reaction hereof is conducted under such non-forcing conditions that substantially no decomposition products are formed. In other words, the reaction is effected in an aqueous medium by gradual addition stepwise of the propylene oxide to the ethylene diamine at atmospheric pressure and at a temperature below about 70° C. Also, it has been found that in order to avoid formation of a solid reaction product the concentration of the ethylene diamine in the water should initially not exceed 35 percent by weight of the total amount of water and ethylene diamine.

Above about 3.5 molar ratio of propylene oxide to ethylene diamine, higher temperatures are required to effect the reaction, and it is difficult to obtain the reaction without decomposition products being formed, and without excessive loss of the propylene oxide if special means are not provided for recovering the same. Formation of the bis (beta hydroxy propyl) ethylene diamine has been found advantageous for the purposes of this invention, and to provide such bis compound as the major component in the resultant reaction product the molar ratio of the propylene oxide to ethylene diamine should be at least about 2 to 1.

The resultant reaction product, as indicated above, is useful per se in aqueous solution as a detergent and as a metal ion sequestering agent. It can also be employed as an organic alkali, an acid acceptor or adsorbent, can be admixed with inorganic phosphates in various proportions to provide improved detergents for laundering textiles, and as an alkali builder substitute in quaternary ammonium detergent formulations for inorganic alkalis such as trisodium phosphate, tetrapotassium pyrophosphate, tetrasodium ethylene diamine acetate, or the like.

Of particular usefulness in detergents is the reaction product of the intermediate with sulfonic acids, especially benzene sulfonic acid (either branch chain or linear alkylated) having an alkyl group varying from $C_{9-15}H_{19-31}$ attached to the benzene, and advantageously dodecyl benzene sulfonic acid. The molar ratio of the sulfonic acid to the intermediate may vary widely, depending on the particular purpose for which the composition is adapted. Soaps formed with saturated fatty acids, such as stearic acid and with unsaturated fatty acids, such as oleic, are also advantageous reaction products for detergent purposes. An advantageous carbonyl group for unsaturated fatty acids may vary from $C_{14-18}H_{27-35}$, and for saturated fatty acids from $C_{14-19}H_{29-39}$. As with respect to sulfonic acids, the molar ratio of the intermediate to fatty acids may also vary widely.

The concentration of the (beta hydroxy propyl) ethylene diamine reaction product in the aqueous vehicle may vary widely, and this is also true with respect to salts or complexes which may be formed therewith for various uses.

The intermediate reaction product of the (beta hydroxy propyl) ethylene diamine with dodecyl benzene in aqueous solution, at a pH of about 9.5 has been found extremely valuable as a blood stain remover, and at a pH of about 8.5, a very effective cleaner for hard surfaces, such as walls, floors, plastics, and metal such as chromium. In this connection, pH can be readily controlled by the amount of the organic acid reacted with the intermediate hereof.

From the preceding, it is seen that the invention has as its objects among others, the provision of a particular reaction product of propylene oxide and ethylene diamine in which substantially all the hydroxy groups are beta hydroxy propyl groups, which when combined with other compounds to form salts is useful for many purposes, and which can be employed per se as a cleaner and ion sequestering agent; and the provision of a simple and economical method for making such product. Other objects of the invention will become apparent from the following more detailed description.

By conducting the reaction between the propylene oxide and ethylene diamine in the molar ratios of about 2 to 3.5, respectively, and under the non-forcing conditions described in greater detail hereinafter, a mixture comprising mono, bis, tris and tetra (beta hydroxy propyl) ethylene diamine is formed, having, respectively, the following formulae:

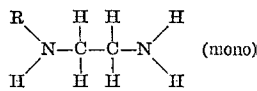 (mono)

and

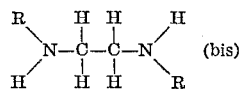 (bis)

and

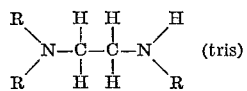 (tris)

and

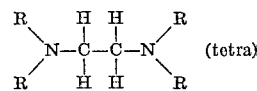 (tetra)

wherein R is the beta hydroxy propyl group:

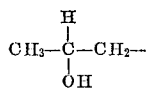

and wherein the bis compound constitutes the major amount of between about 40 to 60 percent by weight, compared to the individual amounts of the mono, tris and tetra compounds which are each in a minor amount. Inasmuch as a mixture of such compounds is formed including the mono- bis and tris (beta hydroxy propyl) ethylene diamine, it will be observed from the foregoing reaction formulae that the ethylene diamine is not completely or totally propylated to the tetra compound. Hence, there is available the advantageous free terminal hydrogen atom attached directly to at least some of the nitrogen of the original ethylene diamine, for obtaining reaction products, without affecting the important functional effects of the terminal beta hydroxy propyl groups.

The most advantageous molar ratio which provides an optimum number of beta hydroxy propyl groups with minimum decomposition products is about 3.3 of the propylene oxide to 1 mol of the ethylene diamine. If the ratio is substantially in excess of 3.5 to 1, the reaction must be forced either by employing relatively high temperatures or by conducting the reaction at pressures above atmospheric, since it is difficult to obtain substantially complete substitution of beta hydroxy propyl groups for the hydrogen atoms attached to nitrogen of the ethylene diamine molecule.

The most advantageous manner of effecting the reaction under non-forcing conditions and at the same time form a liquid reaction product at which this invention aims, is to provide initially an aqueous solution of the ethylene diamine not exceeding approximately 35 percent by weight of the total solution, and desirably an amount of ethylene diamine of about 0.25 to 35 percent by weight of the solution. Upon introduction of the propylene oxide into the aqueous ethylene diamine solution, the reaction proceeds solely exothermically.

The reaction is conducted under atmospheric conditions to obviate possibility of decomposition products which are favored when the reaction is effected in an autoclave even though at lower temperatures than about 70° C. Gradual, and stepwise addition of the propylene oxide in increments, while stirring the mixture is also important in avoiding decomposition products; and to preclude excessive rise in temperature above about 70° C., cooling of the reaction vehicle during the reaction is employed whenever it is noted that the temperature begins to rise rapidly. Forcing conditions in the reaction can be readily determined by observation because of a notable and marked boiling effect which occurs if the propylene oxide is introduced too rapidly and too great an amount at one time. Likewise, one can readily determine when the reaction is complete when the boiling effect disappears.

The following are typical examples illustrative of the invention for preparation of the intermediate reaction product hereof:

Example I

To 24.5 kilograms (kgs.) of water in a vessel equipped with an agitator and external water-cooling coils are added at one time 2.04 kgs. of liquid ethylene diamine providing a concentration of about 7.7 percent. 3.31 kgs. of propylene oxide are then gradually added over a period of about 7 minutes. The temperature increases to about 37° C. Cooling water is then admitted at such a rate that the temperature does not exceed about 55° C. In about 25 minutes, the first reaction step is over as can be determined by the absence of boiling, and the temperature drops subsequently to about 24° C. in about 16 minutes. At this point, 3.20 additional kgs. of propylene oxide are gradually added under stirring over a period of about 10 minutes. Without cooling, the temperature of the mixture increases from about 24° C. to about 55° C. in about 25 minutes. Cooling water is then admitted merely to arrest temperature rise. In 4 minutes, the temperature is about 48° C. and cooling is discontinued. About 30 minutes later, the reaction has been completed, as can be determined by complete absence of boiling effect and the temperature rises to about 57° C.

In the amounts specified, 3.3 mols of propylene oxide are reacted with 1 mol of ethylene diamine to produce a 25 percent concentration of the intermediate reaction product in the aqueous solution. Such product comprises a major amount (about 40 percent) of bis (beta hydroxy propyl) ethylene diamine, and minor amounts of each of mono, tris and tetra (beta hydroxy propyl) ethylene diamine.

Example II

By the method of Example I, 60 kgs. of ethylene diamine are mixed with 154 kgs. of water to form a 28 percent solution. Propylene oxide is then added stepwise at such a rate that, with external cooling applied, the temperature does not exceed 70° C., until a total of 174 kgs. have been added over a period of about 2½ hrs. The resultant product is substantially a 60 percent water solution of a mixture of mono, bis, tris, and tetra beta hydroxy propyl ethylene diamines in which the mol ratio of propylene oxide to ethylene diamine is 3.0 to 1 and in which the bis (beta hydroxy propyl) ethylene diamine is in a major amount (substantially about 60 percent).

An advantageous property of the reaction product is its resistance to change in pH (buffering capacity) when reacted with dodecyl benzene sulfonic acid, and oleic acid. Thus, with the 3.3 molar reaction product made by Example I, there is very little change in pH between 8 and 10 when, for example, from between 10 grams to 70 grams of dodecyl benzene sulfonic acid are titrated potentiometrically with 393 grams of a 25 percent aqueous solution of the reaction product of Example I. With oleic acid under the same conditions, there was very little change in pH between 10 and 85 grams of oleic acid. This is a very useful property in formulating various types of cleaners by reacting the intermediate with sulfonic and fatty acids, as the resultant salts can be readily employed in a variety of types of laundering and dry cleaning systems where pH is important.

A most advantageous salt is that of dodecyl benzene sulfonic acid (either branch chain or linear alkylated) with the aforementioned intermediate resulting from the intermediate reaction product of 1 mol of ethylene diamine with about 2 to 3.5 mol of propylene oxide. Generally, advantageous cleaning compositions are obtained by reaction of 1 mol of the intermediate reaction product to about 0.06 to 1.2 mols of dodecyl benzene sulfonic acid to provide a pH varying from 5.5 to 10.5 in concentrations of 0.05 to 99 percent by weight of an aqueous solution thereof based on the total amount of the solution. All that need be done in forming the salt is to mix the desired amount of dodecyl benzene in an aqueous solution of the intermediate.

A particular important use is that of blood stain removal which is one of the most difficult of stains to remove when dry and set. Generally, effective blood stain removal compositions comprise the reaction product of about 1 mol of the intermediate reaction product (desirably 3.0 to 3.5 mol of propylene oxide to 1 mol of ethylene diamine) with about 0.06 to 0.5 mol of dodecyl benzene sulfonic acid, in concentrations of about 0.05 to 99 percent by weight of such salt in aqueous solution based upon the total amount of the solution, with a pH varying from 8.5 to 10.5. The following is a typical example of an efficaceous blood stain remover:

Example III 32.7 kgs. of the 25 percent solution of Example I are mixed with 1.6 kgs. of commercial branch chain dodecyl benzene sulfonic acid (containing 88 percent of the sulfonic acid, 7 percent sulfuric acid, 1 percent unsulfonated oil, and 4 percent water, all by weight), and stirred until all of such sulfonic acid is reacted in the solution (the molar ratio of the intermediate to benzene sulfonic acid being about 1.0 to 0.15). This entire amount of the resultant salt solution is then diluted with 103.0 kgs. of water and stirred until the mixture is uniform. The resultant product has a pH of about 9.5 and a concentration of about 7.0 percent of the salt of dodecyl benzene sulfonic acid with the (beta hydroxy propyl) ethylene diamine.

Not only is such composition useful for blood removal but also for removing proteins or water soluble or water dispersible stains from fabrics in both laundry and dry cleaning plants. It is safe to use on colored garments which might otherwise be affected by other preparations strong enough to remove such type of stains. It possesses anti-bacterial properties and also serves as a deodorant on such stains, as blood, perspiration, urine, or the like.

In applying the blood remover, all that is necessary is to wash the stain by rubbing it with or immersing it in the solution until the stain disappears.

The dodecyl benzene sulfonic acid salt of the intermediate hereof can be used in conventional laundering and dry cleaning operations, and may be mixed with conventional laundry and dry cleaning agents including surfactants and wetting agents. A typical example of such use is as follows:

Example IV 32.7 kgs. of the 25 percent solution of the intermediate of Example I are mixed with 8.2 kgs. of the aforementioned commercial dodecyl benzene sulfonic acid, and with 4.1 kgs. of the anionic wetting agent dioctyl sulfosuccinate (Aerosol OT by Carbide & Carbon Co., containing 75 percent active anionic); the molar ratio of the intermediate to the benzene sulfonic acid being about 1 to 0.7. The resultant solution has a pH of about 8.0.

8.2 kgs. of the solution is admixed with 31.0 kgs. of diatomaceous earth filter powder, and with 1.9 kgs. of white mineral oil which will produce a substantially dry powder. When 0.45 kg. of this powder is added to 45.5 kgs. of garments to be dry cleaned in a conventional perchloroethylene dry cleaning solvent, the resultant mixture provides an efficaceous detergent bath for removal of both water and solvent soluble stains, for providing a filter cake medium for removal of suspended soils, and for lubrication of zippers on garments which might otherwise be difficult to work.

An aqueous solution of the dodecyl benzene sulfonic acid salt of the intermediate hereof is also an excellent cleaner for such hard surfaces as floors, waxed surfaces, linoleum, woodwork, terrazzo tile, plastic, chromium plated surfaces, stainless steel, enameled and porcelain ware, lacquered or painted automobile body surfaces, and the like. The following is a typical example of such composition:

Example V 32 kgs. of the 25 percent solution of the intermediate of Example I are mixed with 6 kgs. of the aforementioned commercial dodecyl benzene sulfonic acid and with 62 kgs. of water, providing a concentration of the resultant salt of about 13.0 percent by weight of the solution; the molar ratio of the intermediate to benzene sulfonic acid being about 1 to 0.5, and the resulting pH about 8.5.

This solution of such concentration can be used directly in a conventional manner for washing the aforementioned hard surfaces but it is generally desirable to dilute the same with water, a preferable dilution being about 1 oz. per gallon of water (1 to 128). In such concentration, the solution will effectively clean the aforementioned surfaces without damage thereto. For delicate finishes, it may be further diluted with water up to about 500 times the amount thereof. Advantages of such cleaning solution are its utility in water of varying degrees of hardness, ready rinsability, the absence of a film on the surface after cleaning, and the ability of the composition to remove soil and stains without affecting the finish of the surface to be cleaned, such as a waxed floor.

Should it be desired that wax be stripped from surfaces or that paint films be etched, all that is necessary in the composition of this example is to increase the ratio of the intermediate to dodecyl benzene sulfonic acid to obtain a higher pH.

An example of such a composition is about 1 mol of the intermediate of Example I to about 0.06 mol of dodecyl benzene sulfonic acid to obtain a pH of about 10.5. Such solution when diluted with about 9 to 64 times the amount thereof with water, will effectively remove and emulsify waxes from surfaces, and will etch painted surfaces. A preferable dilution is about 1 oz. to a quart of water (1 to 32).

Chelating or sequestering ability for metallic ions is an important property of cleaning or treating compositions, such as, for example, in metal finishing, in textile cleaning or processing, and the like. Prior to this invention many chelating type compounds have been employed, such as sodium tripolyphosphate, tetra sodium pyrophosphate, sodium gluconate, tetra sodium ethylene diamine tetra acetate, and the like. A disadvantage of these compounds has been their lack of sequestering ability on metal ions, such as iron, in or on mediums or environments having relatively high pH levels. For example, sequestering ability on iron starts decreasing drastically at pH 10 and falls off to substantially zero at pH 11.

The intermediate hereof in the molar ratio range of about 2.0 to 3.5 mols of propylene oxide to 1 mol of ethylene diamine is very effective per se in sequestering metallic ions from mediums, generally liquid, particularly iron which is difficult to sequester in environments of a high pH.

Example VI

The intermediate of Example I will sequester iron (as $Fe^{+++}$) very effectively in pH ranges of 11 to 12. For example, it was found that 2.8 parts by weight of the intermediate solution of Example I (0.7 part of active ingredient as calculated from the 25 percent concentration of Example I) sequestered 0.35 part by weight of iron ($Fe^{+++}$) at a pH of 11.2. Based on active ingredient, this is a ratio of 0.5 part of iron ($Fe^{+++}$) to 1 of active sequestrant.

Also, the intermediate of Example I will solubilize iron from precipitated $Fe(OH)_3$ (ferric hydroxide) at a pH of 11.8. Thus, it was found that 2.8 parts by weight of the intermediate solution of Example I (0.7 part of active ingredient as calculated from the 25 percent concentration of Example I) solubilized 0.31 part by weight of iron as $Fe^{+++}$ from an aqueous solution containing an excess of precipitated $Fe(OH)_3$ (ferric hydroxide) at a pH measured as 11.8. Based on active ingredient this is a ratio of 0.44 part iron ($Fe^{+++}$) solubilized per 1 part of active sequestrant.

Similarly, it was found that 1 part by weight of the active ingredient of the intermediate solution of Example I sequestered 0.51 part by weight of calcium (as $CaCO_3$) at pH 6; 0.44 part at pH 7; and 0.17 part at pH 8.

What is claimed is:

1. A cleaning composition consisting essentially of an aqueous solution of the acid addition salt of (A) the reaction product of between 1 mol of ethylene diamine and 2.0 to 3.5 mol of propylene oxide consisting essentially of a mixture of mono, bis, tris and tetra (beta hydroxy propyl) ethylene diamine in which all substituted groups attached to nitrogen of the product consist essentially of beta hydroxy propyl groups and the free hydrogen atom is attached directly to at least some of the nitrogen of said reaction product, and (B) an organic acid of the group consisting of alkyl benzene sulfonic acids having a $C_{9-15}H_{19-31}$ alkyl group, unsaturated fatty acids having a $C_{14-18}H_{27-35}$ carbonyl group, and saturated fatty acids having a $C_{14}$—$H_{19}$—$H_{29-39}$ carbonyl group.

2. A cleaning composition consisting essentially of an aqueous solution of about 0.05 to 99% by weight of the acid addition salt of (A) about 1 mol of the reaction product of about 1 mol of ethylene diamine and about 2.0 to 3.5 mol of propylene oxide consisting essentially of a mixture of mono, bis, tris and tetra (beta hydroxy propyl) ethylene diamine in which all substituted groups attached to nitrogen of the product consist essentially of beta hydroxy propyl groups and the free hydrogen atom is attached directly to at least some of the nitrogen of said reaction product and (B) about 0.06 to 1.2 mol of dodecyl benzene sulfonic acid.

3. A cleaning composition consisting essentially of an aqueous solution of about 0.05 to 99% by weight of the acid addition salt of (A) about 1 mol of the reaction product of about 1 mol of ethylene diamine and about 2.0 to 3.5 mol of propylene oxide consisting essentially of a mixture of mono, bis, tris and tetra (beta hydroxy propyl) ethylene diamine in which all substituted groups attached to nitrogen of the product consist essentially of beta hydroxy propyl groups and the free hydrogen atom is attached directly to at least some of the nitrogen of said reaction product, and (B) about 0.06 to 1.2 mol of dodecyl benzene sulfonic acid, said composition having a pH of about 5.5 to 10.5.

4. A blood stain removing composition consisting essentially of an aqueous solution of about 0.05 to 99 percent by weight of the acid addition salt of (A) about 1 mol of the reaction product of about 1 mol of ethylene diamine and about 3.0 to 3.5 mol of propylene oxide consisting essentially of a mixture of mono, bis, tris and tetra (beta hydroxy propyl) ethylene diamine in which all substituted groups attached to the nitrogen of the product consist essentially of beta hydroxy propyl groups and the free hydrogen atom is attached directly to at least some of the nitrogen of said reaction product, and (B) about 0.06 to 0.5 mol of dodecyl benzene sulfonic acid, the solution having a pH of about 8.5 to 10.5.

5. The composition of claim 4 in which the concentration of said solution is about 7 percent, the amount of dodecyl benzene sulfonic acid being about 0.15, to 1 mol of said reaction product (A), the solution having a pH of about 9.5.

6. The method of removing blood stains from fabrics or the like which comprises washing the stain with an aqueous solution consisting essentially of about 0.05 to 99% by weight of the acid addition salt of (A) about 0.06 to 0.5 mol of dodecyl benzene sulfonic acid with (B) the reaction product of about 1 mol of ethylene diamine and about 3.0 to 3.5 mol of propylene oxide consisting essentially of a mixture of mono, bis, tris and tetra (beta hydroxy propyl) ethylene diamine in which all substituted groups attached to nitrogen of the product consist essentially of beta hydroxy propyl groups and the free hydrogen atom is attached directly to at least some of the nitrogen of said reaction product, the solution having a pH of about 8.5 to 10.5.

7. The method of sequestering metal ions which comprises contacting said ions in an aqueous medium to the reaction product consisting essentially of between 1 mol of ethylene diamine and 2.0 to 3.5 mols of propylene oxide consisting essentially of a mixture of mono, bis, tris and tetra (beta hydroxy propyl) ethylene diamine in which all substituted groups attached to the nitrogen of the product consist essentially of beta hydroxy propyl groups and the free hydrogen atom is attached directly to at least some of the nitrogen of said reaction product.

8. The method of sequestering iron ions which comprises contacting said ions in an aqueous medium to the reaction product consisting essentially of between 1 mol of ethylene diamine and 2.0 to 3.5 mols of propylene oxide consisting essentially of a mixture of mono, bis, tris and tetra (beta hydroxy propyl) ethylene diamine in which all substituted groups attached to the nitrogen of the product consist essentially of beta hydroxy propyl groups and the free hydrogen atom is attached directly to at least some of the nitrogen of said reaction product.

9. The method of claim 8 wherein said iron ions are in an environment of a relatively high pH of about 11 to 12.

References Cited

UNITED STATES PATENTS

| | | | |
|---|---|---|---|
| 2,697,118 | 12/1954 | Lundsted et al. | 260—584 |
| 2,806,060 | 9/1957 | Bersworth | 260—584 |

FOREIGN PATENTS

| | | |
|---|---|---|
| 557,291 | 5/1958 | Canada. |
| 764,188 | 8/1956 | Great Britain. |

OTHER REFERENCES

Organic Metal Co-ordinate Compounds, Bergy, Amer. Jour. of Pharmacy, vol. 126, #6, June 1954, pp. 209–216.

LEON D. ROSDOL, *Primary Examiner.*

S. D. SCHWARTZ, *Assistant Examiner.*